(12) United States Patent
Yokota et al.

(10) Patent No.: US 8,237,874 B2
(45) Date of Patent: Aug. 7, 2012

(54) DISPLAY SCREEN TURNING APPARATUS

(75) Inventors: Katsuyuki Yokota, Daito (JP);
Toshiharu Hibi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1302 days.

(21) Appl. No.: 11/939,333

(22) Filed: Nov. 13, 2007

(65) Prior Publication Data

US 2008/0111929 A1   May 15, 2008

(30) Foreign Application Priority Data

Nov. 14, 2006   (JP) ................................. 2006-009273

(51) Int. Cl.
*H04N 5/655*   (2006.01)
*H04N 5/64*   (2006.01)

(52) U.S. Cl. ..................... 348/827; 348/836; 361/679.06

(58) Field of Classification Search .................. 348/794, 348/827; 361/679.02, 679.06, 679.2, FOR. 104; 312/7.2

See application file for complete search history.

(56) References Cited

U.S. PATENT DOCUMENTS

| | | | | |
|---|---|---|---|---|
| 2,895,770 | A | * | 7/1959 | Matthews ..................... 384/617 |
| 5,090,823 | A | * | 2/1992 | Lindsey et al. ................ 384/605 |
| 5,243,434 | A | * | 9/1993 | Nodama ........................ 348/827 |
| 6,116,560 | A | * | 9/2000 | Kim ............................. 248/371 |
| 6,801,426 | B2 | | 10/2004 | Ichimura |
| 7,762,513 | B2 | * | 7/2010 | Sawai et al. ................. 248/349.1 |
| 7,869,203 | B2 | * | 1/2011 | Sawai et al. ............... 361/679.22 |
| 8,094,244 | B2 | * | 1/2012 | Sawai et al. ................... 348/836 |
| 2002/0149906 | A1 | * | 10/2002 | Ichimura ....................... 361/681 |
| 2003/0062461 | A1 | | 4/2003 | Kurimoto et al. |
| 2008/0035821 | A1 | * | 2/2008 | Kameoka et al. ........... 248/349.1 |
| 2009/0031926 | A1 | | 2/2009 | Goda |
| 2009/0284668 | A1 | * | 11/2009 | Sawai et al. ................... 348/836 |

FOREIGN PATENT DOCUMENTS

| | | |
|---|---|---|
| EP | 1 892 454 A1 | 2/2008 |
| JP | 62-138885 A | 6/1987 |
| JP | 4-61385 U | 5/1992 |
| JP | 9-26754 A | 1/1997 |
| JP | 2000-81845 A | 3/2000 |
| JP | 2002-311845 A | 10/2002 |
| JP | 2004-150515 A | 5/2004 |
| JP | 2006-120963 A | 5/2006 |
| WO | WO 2006/092834 A1 | 9/2006 |

OTHER PUBLICATIONS

Extended European Search Report dated May 19, 2010 (eight (8) pages).

* cited by examiner

*Primary Examiner* — Joshua J Michener
*Assistant Examiner* — Ryan Kwiecinski
(74) *Attorney, Agent, or Firm* — Crowell & Moring LLP

(57) ABSTRACT

This display screen turning apparatus includes a turntable mounted with a display body and rotatable in a horizontal plane, a base, rotatably holding the turntable, provided with a drawn projecting portion and a floating prevention member so mounted on the projecting portion of the base as to prevent the turntable from upward floating. The floating prevention member has a floating prevention portion provided above a region where the upper surface of the turntable is arranged, a mounting portion for mounting the floating prevention member on the projecting portion and a leg portion provided between the floating prevention portion and the mounting portion for maintaining the base and the floating prevention member at a prescribed interval by coming into contact with the base.

16 Claims, 12 Drawing Sheets

DISPLAY SCREEN TURNING APPARATUS

BACKGROUND OF THE INVENTION

1. Field of the Invention

The present invention relates to a display screen turning apparatus, and more particularly, it relates to a display screen turning apparatus comprising a rotating member rotatable in a horizontal plane.

2. Description of the Background Art

A turning apparatus comprising a rotating member rotatable in a horizontal plane is known in general.

For example, Japanese Patent Laying-Open No. 62-138885 (1987) discloses a rotating table apparatus comprising a rack having a circular recess portion, a circular rotating table rotatably arranged on the upper surface of the circular recess portion of the rack and a monitor stand, loaded with a monitor display, arranged on the upper surface of the rotating table. The rotating table apparatus disclosed in Japanese Patent Laying-Open No. 62-138885 is so formed as to fix the monitor stand, the rotating table and the rack by passing a shaftlike post having a coupling hole (threaded hole) for a screw on the forward end thereof through a through-hole provided at the center of the rotating table and an opening provided at the center of the rack from an opening provided on the monitor stand and fastening a screw to the coupling hole provided on the post from under the lower surface of the rack.

Japanese Utility Model Laying-Open No. 4-61385 (1992) discloses a turntable comprising a circular upper plate, a circular lower plate and a rotatable rotating support plate, provided between the circular upper plate and the circular lower plate, formed by a plurality of steel balls and a cage holding the plurality of steel balls. The turntable disclosed in Japanese Utility Model Laying-Open No. 4-61385 is so formed as to fix the upper plate, the rotating support plate and the lower plate by passing a fixed axle having a flange on the lower end thereof through axial holes provided at the centers of the lower plate and the rotating support plate and a fixed hole provided at the center of the upper plate from under the lower surface of the lower plate and caulking an end of the fixed axle protruding from the upper surface of the upper plate.

In the aforementioned rotating table apparatus disclosed in Japanese Patent Laying-Open No. 62-138885, however, the center of the rotating table is rotatably fixed by the shaftlike post, whereby it is disadvantageously difficult to suppress backlash (floating) on the outer periphery of the rotating table, although the rotating table can be prevented from backlash at the center thereof.

In the aforementioned turntable disclosed in Japanese Utility Model Laying-Open No. 4-61385, the center of the rotating support plate is rotatably fixed by the fixed axle, whereby it is disadvantageously difficult to suppress backlash (floating) on the outer periphery of the rotating support plate, although the rotating support plate can be prevented from backlash at the center thereof.

SUMMARY OF THE INVENTION

The present invention has been proposed in order to solve the aforementioned problems, and an object of the present invention is to provide a display screen turning apparatus capable of suppressing backlash on the outer periphery of a rotating member.

A display screen turning apparatus according to a first aspect of the present invention comprises a rotating member mounted with a display screen and rotatable in a horizontal plane, a base, rotatably holding the rotating member, provided with a drawn projecting portion, and a floating prevention member so mounted on the projecting portion of the base as to prevent the outer periphery of the rotating member from upward floating, while the floating prevention member includes a floating prevention portion provided above a region where the upper surface of the rotating member close to the outer periphery is arranged not to come into contact with the upper surface of the rotating member, a mounting portion for mounting the floating prevention member on the projecting portion and a leg portion provided between the floating prevention portion and the mounting portion for maintaining the upper surface of the base and the floating prevention portion of the floating prevention member at a prescribed interval by coming into contact with the upper surface of the base.

The display screen turning apparatus according to the first aspect, comprising the floating prevention member including the floating prevention portion provided above the region where the upper surface of the rotating member close to the outer periphery is arranged as hereinabove described, can prevent the outer periphery of the rotating member from upward floating with the floating prevention portion also when force upwardly moving the outer periphery of the rotating member acts on the rotating member, thereby suppressing backlash (floating) on the outer periphery of the rotating member. The floating prevention member is so formed as to include the leg portion provided between the floating prevention portion and the mounting portion for mounting the floating prevention member on the projecting portion of the base for maintaining the upper surface of the base and the floating prevention portion of the floating prevention member at the prescribed interval by coming into contact with the upper surface of the base, whereby the leg portion can inhibit the floating prevention portion of the floating prevention member from coming into contact with the rotating member also when the drawn projecting portion of the base is formed with a height smaller than a prescribed height due to dispersion in dimensional accuracy.

In the aforementioned display screen turning apparatus according to the first aspect, the floating prevention member is preferably formed by a platelike member, and the leg portion provided on the floating prevention member formed by the platelike member is preferably so formed as to come into contact with the outer peripheral surface of the rotating member on a side end surface in the thickness direction. According to this structure, the rotating member can be easily horizontally positioned by arranging the floating prevention member so that the leg portion provided on the floating prevention member formed by the platelike member comes into contact with four points provided on the outer peripheral surface of the rotating member at equiangular intervals, for example.

In the aforementioned display screen turning apparatus according to the first aspect, the floating prevention member preferably further includes a vertically extending connecting portion connecting the floating prevention portion and the mounting portion with each other, and a hole is preferably formed at least on the boundary between the connecting portion and the mounting portion of the floating prevention member. According to this structure, the mechanical strength is reduced in the boundary between the connecting portion and the mounting portion as compared with a case provided with no hole, whereby the boundary between the connecting portion and the mounting portion can be rendered easily deflectable. Also when the height of the drawn projecting portion of the base deviates from the designed value due to dispersion in dimensional accuracy, therefore, the deviation in the height of the drawn projecting portion of the base from the designed value can be absorbed by deflecting the boundary between the connecting portion and the mounting portion, whereby the projecting portion of the base and the floating prevention member can be reliably fixed without adjusting the height of the leg portion.

In the aforementioned display screen turning apparatus according to the first aspect, the distance between an end, closer to the rotating member, of a contact surface of the leg portion coming into contact with the base and a mounting position of the mounting portion is preferably larger than the distance between the end and the floating prevention portion. According to this structure, the floating prevention member is inclined toward the floating prevention portion or the mounting portion about the end of the leg portion when fixed to the projecting portion of the base, if the height of the projecting portion of the base is dispersed. Also in this case, the quantity of inclination (movement in the vertical direction) of the floating prevention portion remains smaller than deviation in the height of the base, mounted with the mounting portion, from a designed value since the distance between the end of the leg portion and the mounting position of the mounting portion is larger than the distance between the end of the leg portion and the floating prevention portion. Thus, fluctuation in the interval between the floating prevention portion and the rotating member can be reduced as compared with a case where the floating prevention member is provided with no leg portion, whereby the floating prevention portion can be further inhibited from coming into contact with the rotating member.

In the aforementioned display screen turning apparatus according to the first aspect, a protrusion protruding toward the upper surface of the rotating member is preferably formed on a portion of the floating prevention portion opposed to the upper surface of the rotating member. According to this structure, the interval between the floating prevention portion and the rotating member can be adjusted by controlling the quantity of projection of the protrusion formed on the portion of the floating prevention portion opposed to the rotating member also when the interval between the floating prevention portion and the rotating member is dispersed due to dispersion in the height of the projecting portion of the base mounted with the mounting portion, whereby precision in the interval between the floating prevention portion and the rotating member can be increased.

In the aforementioned display screen turning apparatus according to the first aspect, a side end surface of the floating prevention portion closer to the rotation center of the rotating member is preferably concavely bent. According to this structure, a turning gear member provided on the rotating member can be prevented from coming into contact with the floating prevention member upon rotation of the rotating member. Thus, the rotating member can smoothly rotate.

In the aforementioned display screen turning apparatus according to the first aspect, the floating prevention member preferably includes a first screw mounting hole circular in plan view and a second screw mounting hole slitlike in plan view. According to this structure, the circular first screw mounting hole of the floating prevention member and a screw mounting hole of the projecting portion of the base can be strongly fixed with a screw on a prescribed position. Also when the screw mounting hole provided on the projecting portion of the base deviates from a designed value, the screw can be easily mounted through the slitlike second screw mounting hole of the floating prevention member.

In the aforementioned display screen turning apparatus according to the first aspect, a positioning protrusion is preferably provided on the upper surface of the drawn projecting portion of the base. According to this structure, the floating prevention member can be positioned with the protrusion, to be mounted on the upper surface of the drawn projecting portion of the base in the positioned state.

In this case, the mounting portion of the floating prevention member preferably includes a concaved engaging portion engaging with the protrusion. According to this structure, the floating prevention member can be easily mounted in the positioned state by engaging the engaging portion of the floating prevention member with the positioning protrusion of the base.

In the aforementioned display screen turning apparatus having the hole formed on the boundary between the connecting portion and the mounting portion, the hole is preferably U-shaped in plan view, and so provided as to separate the leg portion and the connecting portion from each other. According to this structure, the mechanical strength in the boundary between the connecting portion and the mounting portion is further reduced as compared with a case of not separating the leg portion and the connecting portion from each other, whereby the boundary between the connecting portion and the mounting portion can be rendered more easily deflectable. Also when the height of the drawn projecting portion of the base deviates from the designed value due to dispersion in dimensional accuracy, therefore, the deviation in the height of the drawn projecting portion of the base from the designed value can be absorbed by deflecting the boundary between the connecting portion and the mounting portion, whereby the projecting portion of the base and the floating prevention member can be more reliably fixed without adjusting the height of the leg portion.

A display screen turning apparatus according to a second aspect of the present invention comprises a rotating member mounted with a display screen and rotatable in a horizontal plane, a base, rotatably holding the rotating member, provided with a drawn projecting portion and a floating prevention member so mounted on the projecting portion of the base as to prevent the outer periphery of the rotating member from upward floating, while the floating prevention member includes a floating prevention portion provided above a region where the upper surface of the rotating member close to the outer periphery is arranged not to come into contact with the upper surface of the rotating member, a mounting portion for mounting the floating prevention member on the projecting portion, a leg portion provided between the floating prevention portion and the mounting portion for maintaining the upper surface of the base and the floating prevention portion of the floating prevention member at a prescribed interval by coming into contact with the upper surface of the base and a vertically extending connecting portion connecting the floating prevention portion and the mounting portion with each other, the floating prevention member is formed by a platelike member, the leg portion provided on the floating prevention member formed by the platelike member is so formed as to come into contact with the outer peripheral surface of the rotating member on a side end surface in the thickness direction, a hole is formed at least on the boundary between the connecting portion and the mounting portion of the floating prevention member, the distance between an end, closer to the rotating member, of a contact surface of the leg portion coming into contact with the base and a mounting position of the mounting portion is larger than the distance between the end and the floating prevention portion, and a protrusion protruding toward the upper surface of the rotating member is formed on a portion of the floating prevention portion opposed to the upper surface of the rotating member.

The display screen turning apparatus according to the second aspect, comprising the floating prevention member including the floating prevention portion provided above the region where the upper surface of the rotating member close to the outer periphery is arranged as hereinabove described, can prevent the outer periphery of the rotating member from upward floating with the floating prevention portion also when force upwardly moving the outer periphery of the rotating member acts on the rotating member, thereby suppressing backlash (floating) on the outer periphery of the rotating member. The floating prevention member is so formed as to include the leg portion provided between the floating prevention portion and the mounting portion for mounting the floating prevention member on the projecting portion of the base for maintaining the upper surface of the base and the floating prevention portion of the floating prevention member at the prescribed interval by coming into contact with the upper surface of the base, whereby the leg portion can inhibit the floating prevention portion of the floating prevention member from coming into contact with the rotating member also when the drawn projecting portion of the base is formed with a height smaller than a prescribed height due to dispersion in dimensional accuracy.

Further, the leg portion provided on the floating prevention member formed by the platelike member is so formed as to come into contact with the outer peripheral surface of the rotating member on the side end surface in the thickness direction, whereby the rotating member can be easily horizontally positioned by arranging the floating prevention member so that the leg portion provided on the floating prevention member formed by the platelike member comes into contact with four points provided on the outer peripheral surface of the rotating member at equiangular intervals, for example. The floating prevention member is so formed as to further include the vertically extending connecting portion connecting the floating prevention portion and the mounting portion with each other while the hole is formed at least on the boundary between the connecting portion and the mounting portion of the floating prevention member so that the mechanical strength is reduced in the boundary between the connecting portion and the mounting portion as compared with a case provided with no hole, whereby the boundary between the connecting portion and the mounting portion can be rendered easily deflectable. Also when the height of the drawn projecting portion of the base deviates from the designed value due to dispersion in dimensional accuracy, therefore, the deviation in the height of the drawn projecting portion of the base from the designed value can be absorbed by deflecting the boundary between the connecting portion and the mounting portion, whereby the projecting portion of the base and the floating prevention member can be reliably fixed without adjusting the height of the leg portion. The distance between the end, closer to the rotating member, of the contact surface of the leg portion coming into contact with the base and the mounting position of the mounting portion is set larger than the distance between the end and the floating prevention portion, whereby the floating prevention member is inclined toward the floating prevention portion or the mounting portion about the end of the leg portion when fixed to the projecting portion of the base, if the height of the projecting portion of the base is dispersed. Also in this case, the quantity of inclination (movement in the vertical direction) of the floating prevention portion remains smaller than deviation in the height of the base, mounted with the mounting portion, from a designed value since the distance between the end of the leg portion and the mounting position of the mounting portion is larger than the distance between the end of the leg portion and the floating prevention portion. Thus, fluctuation in the interval between the floating prevention portion and the rotating member can be reduced as compared with a case where the floating prevention member is provided with no leg portion, whereby the floating prevention portion can be further inhibited from coming into contact with the rotating member. The protrusion protruding toward the upper surface of the rotating member is formed on the portion of the floating prevention portion opposed to the upper surface of the rotating member so that the interval between the floating prevention portion and the rotating member can be adjusted by controlling the quantity of projection of the protrusion formed on the portion of the floating prevention portion opposed to the rotating member also when the interval between the floating prevention portion and the rotating member is dispersed due to dispersion in the height of the projecting portion of the base mounted with the mounting portion, whereby precision in the interval between the floating prevention portion and the rotating member can be increased.

In the aforementioned display screen turning apparatus according to the second aspect, a side end surface of the floating prevention portion closer to the rotation center of the rotating member is preferably concavely bent. According to this structure, a turning gear member provided on the rotating member can be prevented from coming into contact with the floating prevention member upon rotation of the rotating member. Thus, the rotating member can smoothly rotate.

In the aforementioned display screen turning apparatus according to the second aspect, the floating prevention member preferably includes a first screw mounting hole circular in plan view and a second screw mounting hole slitlike in plan view. According to this structure, the circular first screw mounting hole of the floating prevention member and a screw mounting hole of the projecting portion of the base can be strongly fixed with a screw on a prescribed position. Also when the screw mounting hole provided on the projecting portion of the base deviates from a designed value, the screw can be easily mounted through the slitlike second screw mounting hole of the floating prevention member.

In the aforementioned display screen turning apparatus according to the second aspect, a positioning protrusion is preferably provided on the upper surface of the drawn projecting portion of the base. According to this structure, the floating prevention member can be positioned with the protrusion, to be mounted on the upper surface of the drawn projecting portion of the base in the positioned state.

In this case, the mounting portion of the floating prevention member preferably includes a concaved engaging portion engaging with the protrusion. According to this structure, the floating prevention member can be easily mounted in the positioned state by engaging the engaging portion of the floating prevention member with the positioning protrusion of the base.

In the aforementioned display screen turning apparatus having the hole formed on the boundary between the connecting portion and the mounting portion, the hole is preferably U-shaped in plan view, and so provided as to separate the leg portion and the connecting portion from each other. According to this structure, the mechanical strength in the boundary between the connecting portion and the mounting portion is further reduced as compared with a case of not separating the leg portion and the connecting portion from each other, whereby the boundary between the connecting portion and the mounting portion can be rendered more easily deflectable. Also when the height of the drawn projecting portion of the base deviates from the designed value due to dispersion in dimensional accuracy, therefore, the deviation in the height of the drawn projecting portion of the base from the designed value can be absorbed by deflecting the boundary between the connecting portion and the mounting portion, whereby the projecting portion of the base and the floating prevention member can be reliably fixed without adjusting the height of the leg portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

The structures of a display screen turning apparatus 20 according to an embodiment of the present invention and a liquid crystal television 100 provided with the display screen turning apparatus 20 are described with reference to FIGS. 1 to 12. This embodiment of the present invention is applied to the display screen turning apparatus 20 for the liquid crystal television 100 employed as an exemplary display.

Figure 1:
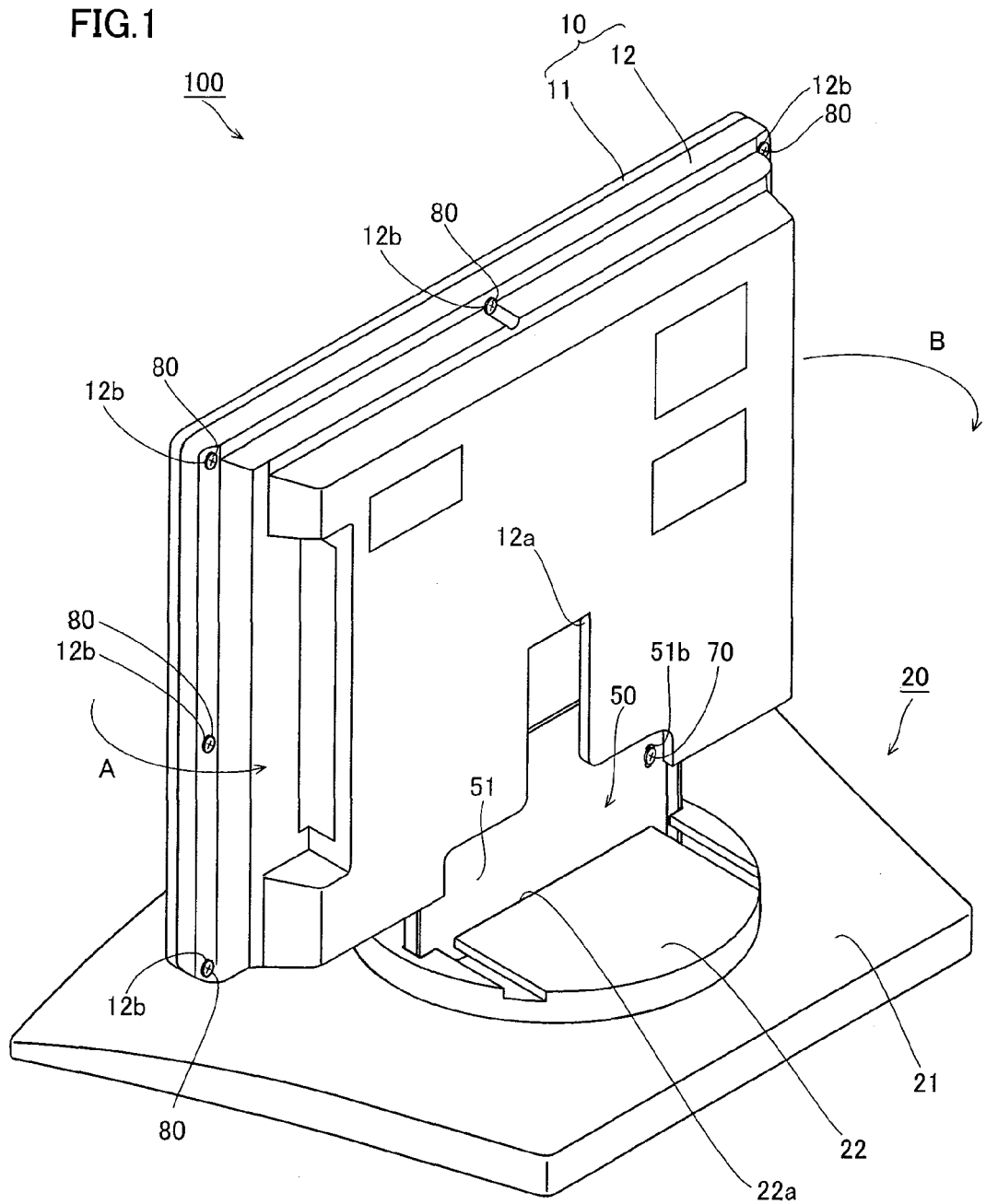
FIG. 1 is a perspective view showing the overall structure of a liquid crystal television provided with a display screen turning apparatus according to an embodiment of the present invention.

The display screen turning apparatus 20 according to the embodiment of the present invention is provided for turning a display body 10 of the liquid crystal television 100 supported by a display screen support mechanism 50 left- and rightward (along arrows A and B) (by ±30° according to this embodiment), as shown in FIG. 1. The display body 10 is an example of the "display screen" in the present invention.

Figure 2:
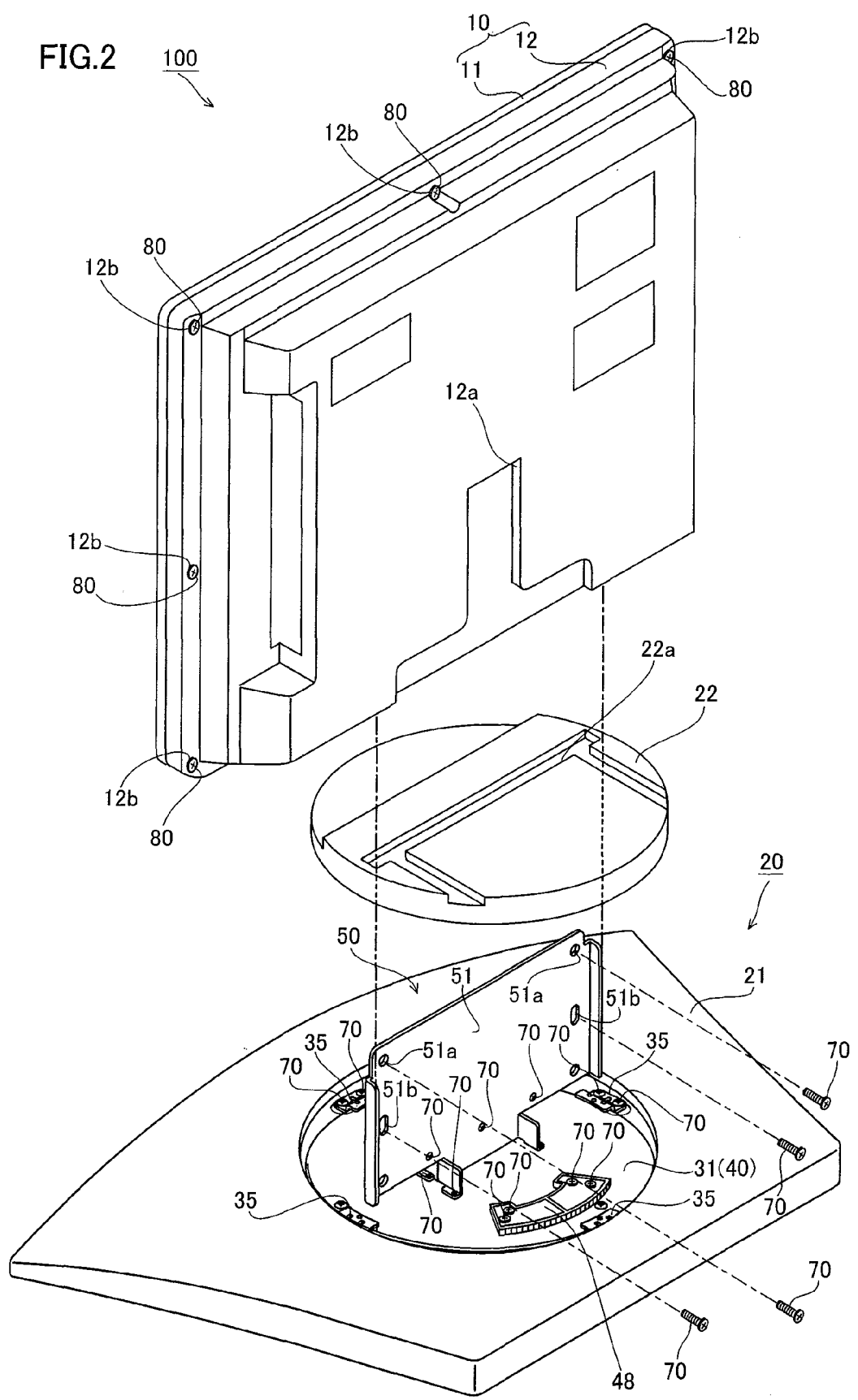
FIG. 2 is an exploded perspective view of the liquid crystal television provided with the display screen turning apparatus according to the embodiment shown in FIG. 1.
Figure 3:
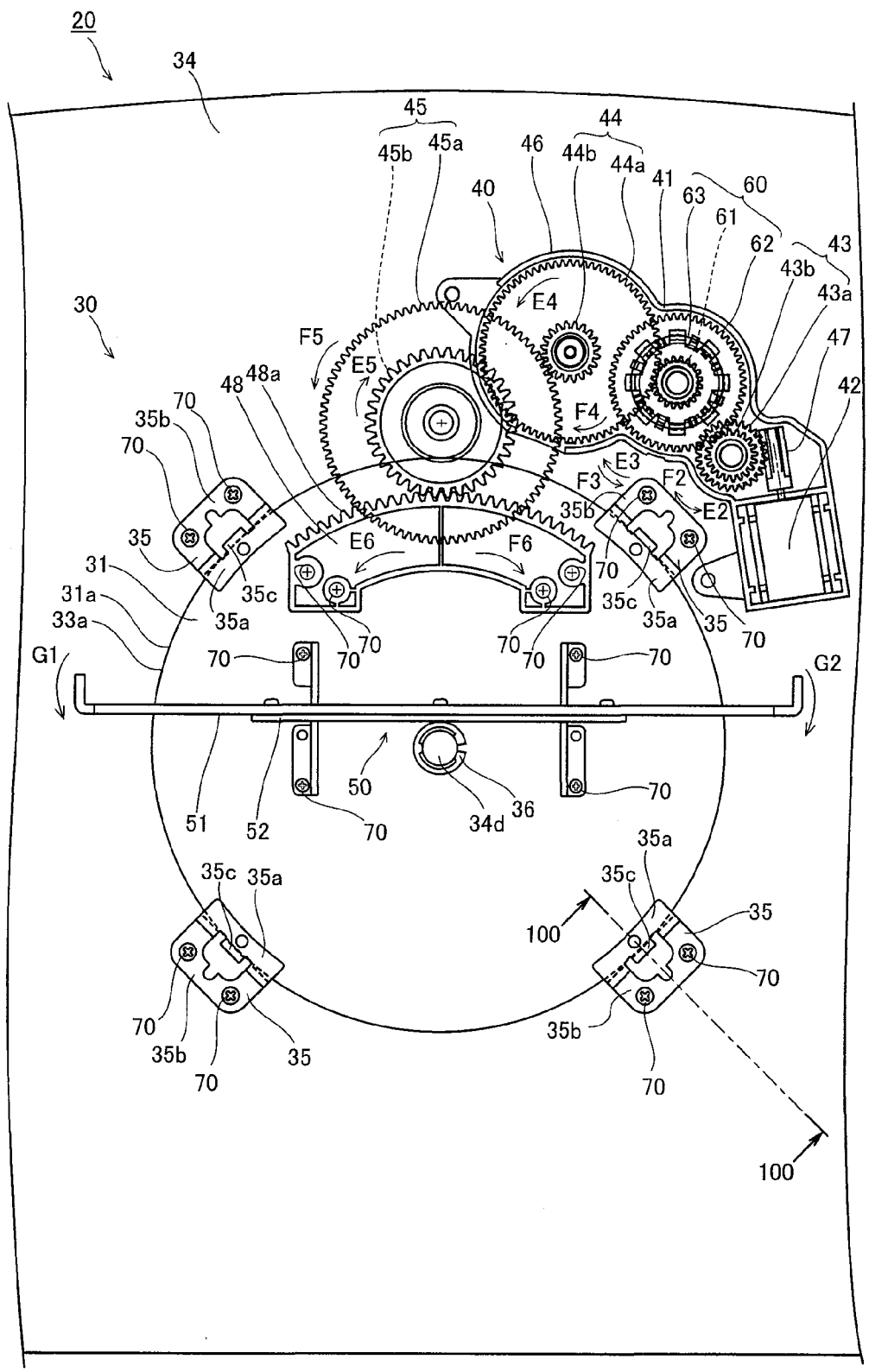
FIG. 3 is a plan view of the display screen turning apparatus according to the embodiment shown in FIG. 1.

As shown in FIG. 3, the display screen turning apparatus 20 is constituted of a turning portion 30 for turning the display body 10 (see FIG. 2) supported by the display screen support mechanism 50 left- and rightward (along arrows A and B in FIG. 1) in a horizontal plane and a driving portion 40, formed by a plurality gears etc. described later, provided for turning a turntable 31 described later.

Figure 4:
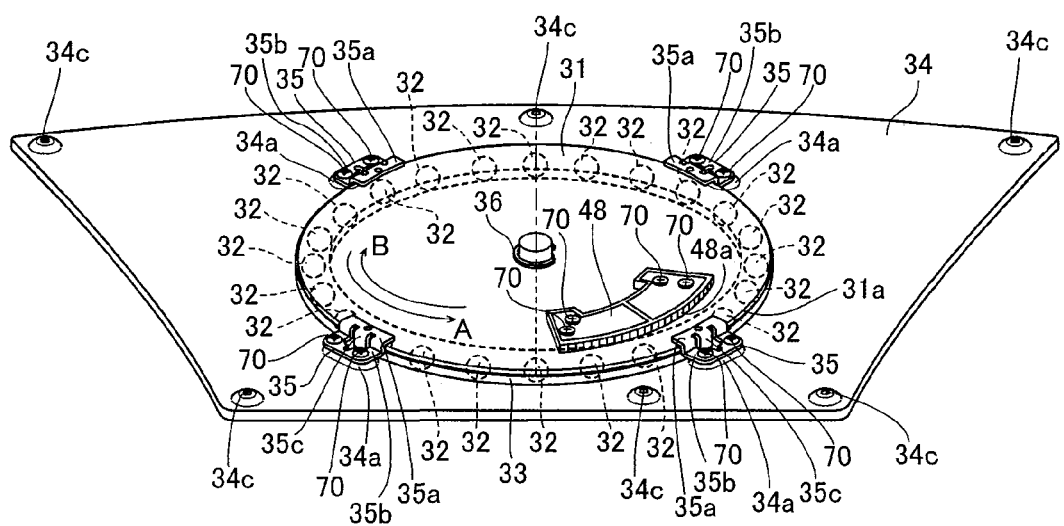
FIG. 4 is a perspective view for illustrating the structure of a turning portion of the display screen turning apparatus according to the embodiment shown in FIG. 1.
Figure 5:
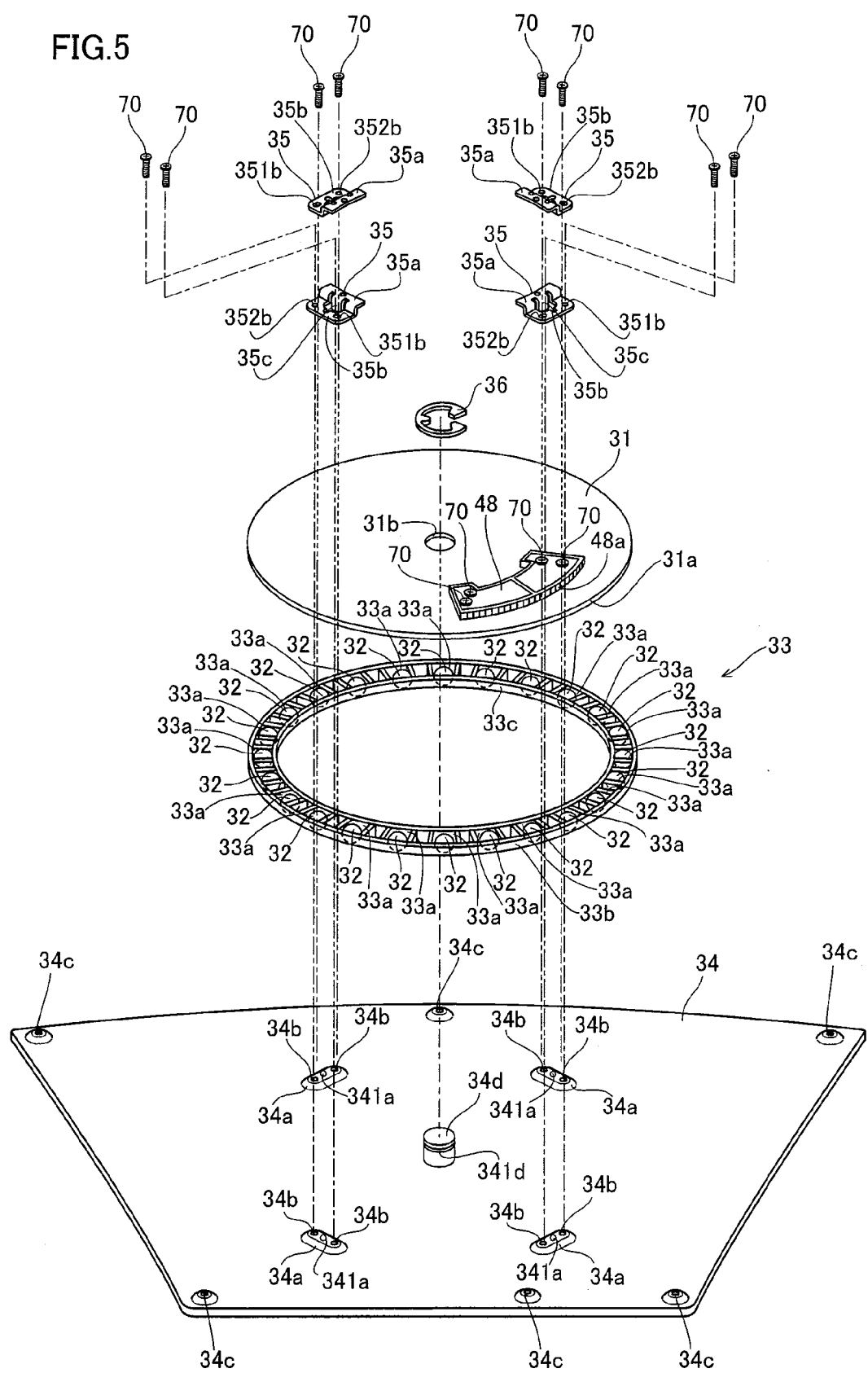
FIG. 5 is an exploded perspective view for illustrating the detailed structure of the turning portion of the display screen turning apparatus according to the embodiment shown in FIG. 1.

The turning portion 30 is constituted of the turntable 31 of sheet metal mounted with the display screen support mechanism 50 (see FIG. 2), 24 steel balls 32 arranged in through-holes 33a of a holding member 33 described later, the holding member 33 of resin rotatably holding the steel balls 32, a base 34 of sheet metal and floating prevention members 35 (four in this embodiment) of sheet metal, as shown in FIGS. 4 and 5. The turntable 31 is an example of the "rotating member" in the present invention.

The holding member 33 of resin is annularly formed in plan view, as shown in FIG. 5. This holding member 33 is provided with the 24 through-holes 33a substantially rectangular (substantially square in this embodiment) in plan view at a prescribed interval. The holding member 33 has a height smaller than the diameter of the steel balls 32 and a diameter substantially equal to that of the outer peripheral surface 31a of the turntable 31. Therefore, the plurality of steel balls 32 charged into the through-holes 33a (see FIG. 5) of the holding member 33 are held between the turntable 31 and the base 34 from above and from below respectively as shown in FIG. 4, so that the turntable 31 is rotatable left- and rightward (along arrows A and B in FIG. 4) on the base 34.

As shown in FIG. 5, projecting portions 34a having an upwardly projectingly drawn shape are formed on the plate-like base 34 of sheet metal by press working (drawing). The quantity of projection (D2 in FIG. 10) of the projecting portions 34a from the upper surface of the base 34 is about 2.95 mm. Protrusions 341a for positioning the floating prevention members 35 described later are provided on the upper surfaces of the projecting portions 34a. The projecting portions 34a are formed at equiangular intervals (intervals of 90° according to this embodiment), to enclose both of the outer peripheral surface 31a of the turntable 31 and the outer peripheral surface 33b. The projecting portions 34a are provided with pairs of screw mounting holes 34b on portions mounted with the floating prevention members 35 respectively, as shown in FIG. 5. The base 34 is provided with upwardly projecting screw receiving holes 34c as shown in FIG. 5, so that a resin cover member 21 (see FIG. 2) described later is mounted on the base 34 with screws (not shown) through the screw receiving holes 34c. A rotating shaft portion 34d of metal is mounted on the base 34 by caulking, as shown in FIG. 5. The rotating shaft portion 34d mounted on the base 34 is inserted into a through-hole 31b provided on the turntable 31 while an E-ring 36 is fitted into a groove portion 341d circumferentially provided on the outer side surface of a portion of the rotating shaft portion 34d protruding from the through-hole 31b of the turntable 31 perpendicularly to the shaft of the rotating shaft portion 34d, so that the steel balls 32 and the holding member 33 are arranged between the turntable 31 and the base 34.

According to this embodiment, each of the floating prevention members 35 formed by platelike members of sheet metal is constituted of a floating prevention portion 35a provided above a portion where an upper surface portion of the turntable 31 (see FIG. 5) close to the outer peripheral surface 31a is arranged, a mounting portion 35b for mounting the floating prevention member 35 on the corresponding projecting portion 34a of the base 34, a leg portion 35c maintaining the base 34 and the floating prevention member 35 at a prescribed interval by coming into contact with the upper surface of the base 34 and a vertically extending connecting portion 35d connecting the floating prevention portion 35a and the mounting portion 35b with each other, as shown in FIGS. 6 to 9.

Figure 7:
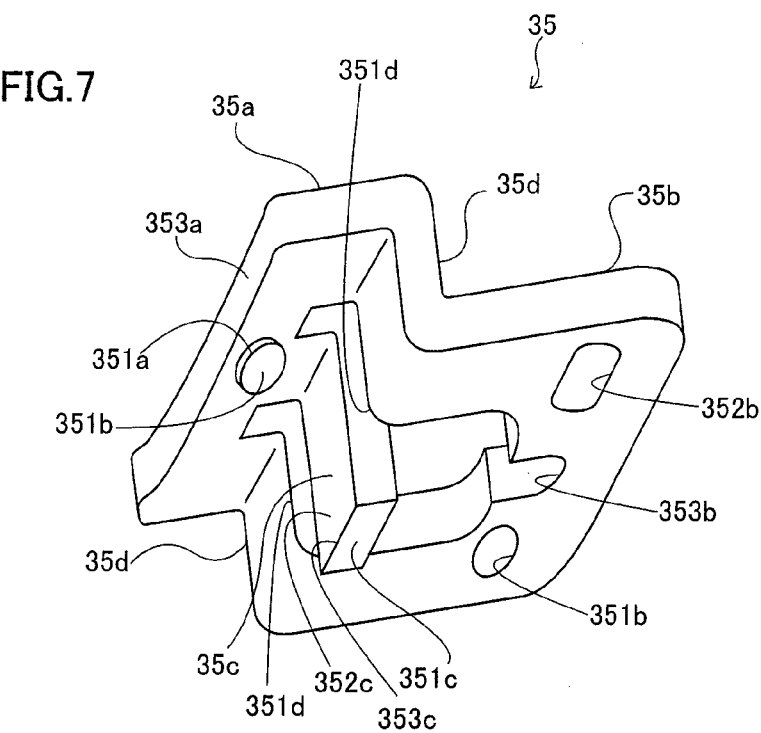
FIG. 7 is a perspective view of the floating prevention member of the display screen turning apparatus according to the embodiment as viewed from below.
Figure 8:
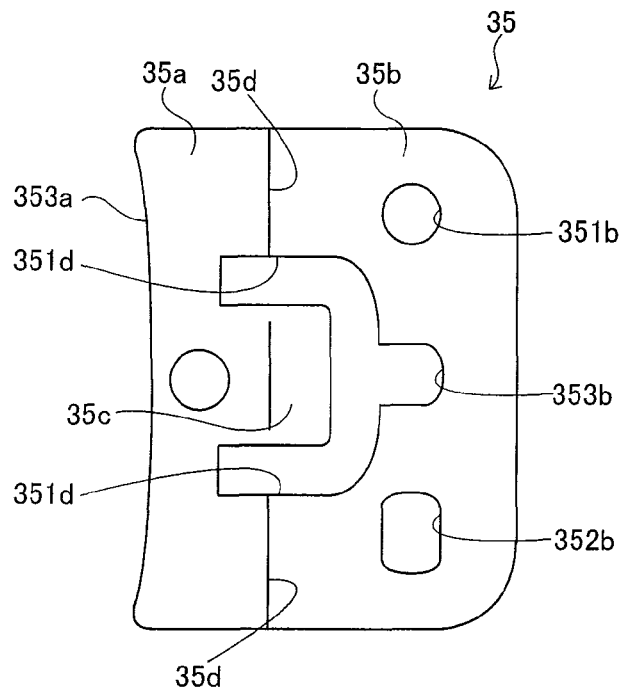
FIG. 8 is a plan view of the floating prevention member of the display screen turning apparatus according to the embodiment as viewed from above.
Figure 9:
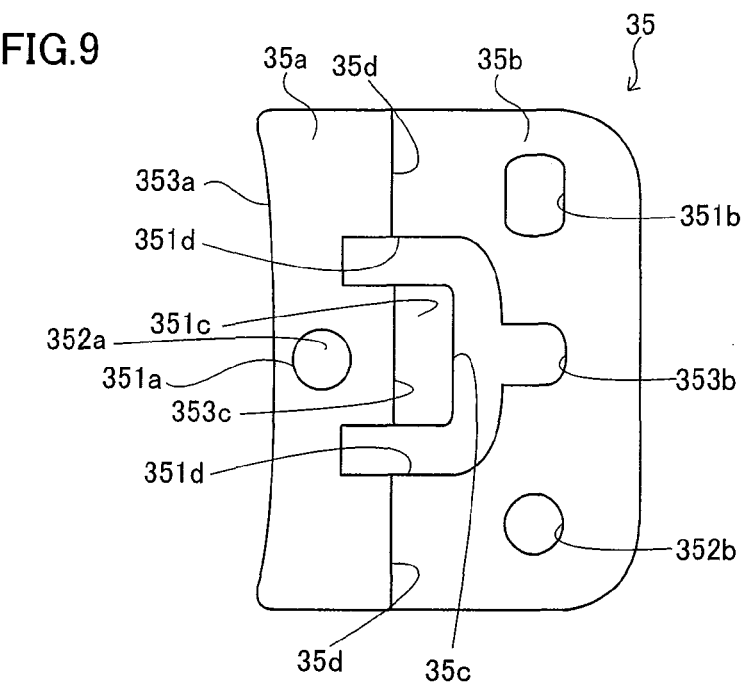
FIG. 9 is a plan view of the floating prevention member of the display screen turning apparatus according to the embodiment as viewed from below.
Figure 10:
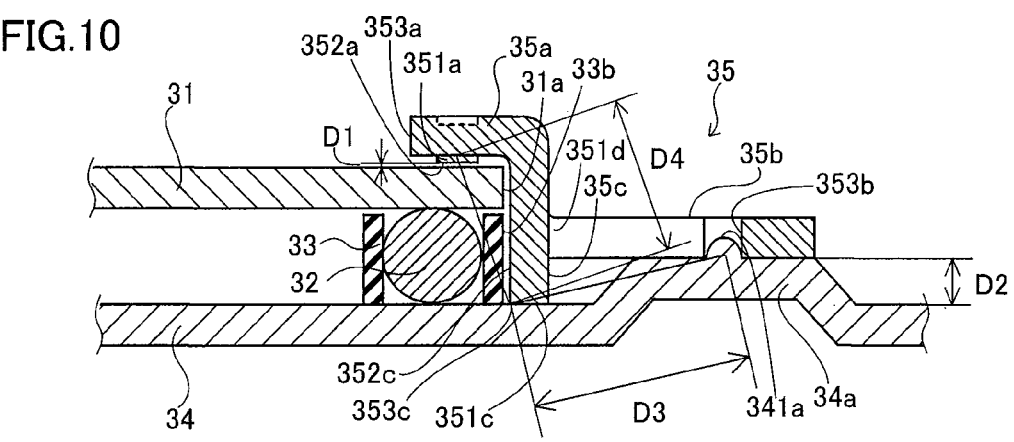
FIG. 10 is a sectional view taken along the line 100-100 in FIG. 3.

According to this embodiment, the floating prevention portion 35a is provided with a protrusion 351a of about 0.5 mm in thickness protruding toward the upper surface of the turntable 31 by half-punching, as shown in FIGS. 7, 9 and 10. The protrusion 351a is so formed by half-punching that a first surface 352a of the protrusion 351a opposed to the upper surface of the turntable 31 can be horizontally formed. Further, the protrusion 351a is so formed that the distance D1 between the same and the upper surface of the turntable 31 is about 0.2 mm when the floating prevention member 35 is mounted on the corresponding projecting portion 34a of the base 34.

As shown in FIGS. 6 to 9, an end surface 353a of the floating prevention member 35a along the axis of rotation of the turntable 31 (see FIG. 5) is concavely bent, in order to prevent a turning gear member 48 of resin described later from coming into contact with the floating prevention member 35 upon turning of the turntable 31 (see FIG. 5). This end surface 353a is an example of the "side end surface" in the present invention.

The mounting portion 35b is provided with screw mounting holes 351b and 352b for mounting the floating prevention member 35 on the corresponding projecting portion 34a of the base 34 with screws 70 (see FIG. 5), as shown in FIGS. 6 to 9. The screw mounting hole 351b is formed circular in plan view with respect to the base 34. On the other hand, the screw mounting hole 352b is formed slitlike in plan view with respect to the base 34, so that the floating prevention member 35 can be fixed to the corresponding projecting portion 34a of the base 34 with the corresponding screw 70 when the interval between the two screw mounting holes 34b provided on the corresponding projecting portion 34a of the base 34 deviates from the designed value. The mounting portion 35b is provided with a concave engaging portion 353b positioning the floating prevention member 35 by engaging with the positioning protrusion 341a (see FIG. 5) provided on the upper surface of the corresponding projecting portion 34a of the base 34. The screw mounting holes 351b and 352b are examples of the "first screw mounting hole" and the "second screw mounting hole" in the present invention respectively.

Figure 6:
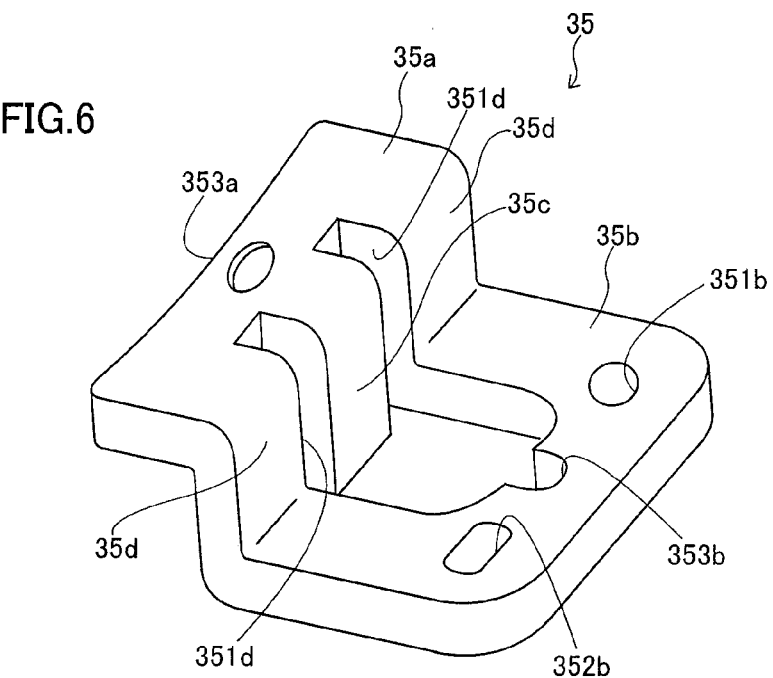
FIG. 6 is a perspective view of a floating prevention member of the display screen turning apparatus according to the embodiment as viewed from above.

According to this embodiment, each floating prevention member 35 formed by the platelike member is provided with the leg portion 35c formed by vertically folding the floating prevention portion 35a downward, as shown in FIGS. 6 and 7. As shown in FIG. 10, the leg portion 35c is so formed that a contact surface 351c provided on the lower end thereof comes into contact with the upper surface of the base 34 when the floating prevention member 35 is mounted on the corresponding projecting portion 34a of the base 34, thereby setting the interval between the upper surface of the base 34 and the lower surface of the floating prevention member 35 (quantity of projection of the projecting portion 34a) D2 to about 2.95 mm. The leg portion 35c is also so formed as to position the outer peripheral surface 31a of the turntable 31 and the outer peripheral surface 33b of the holding member 33 when the floating prevention member 35 is mounted on the corresponding projecting portion 34a of the base 34.

As shown in FIG. 5, the floating prevention portions 35a of the four floating prevention members 35 inhibit the outer peripheral surface 31a of the turntable 31 and the holding member 33 from vertical movement when the turntable 31 rotates left- and rightward (along arrows A and B in FIG. 4).

According to this embodiment, notched holes 351d are formed on the boundary between the connecting portion 35d connecting the floating prevention portion 35a and the mounting portion 35b of each floating prevention member 35 with each other and the mounting portion 35b, as shown in FIGS. 6 to 9. These notched holes 351d, U-shaped in plan view, are connected with the engaging portion 353b provided on the mounting portion 35b, while reaching a part of the floating prevention portion 35a. Further, the notched holes 351d are so formed as to separate the leg portion 35c and the connecting portion 35d from each other. Thus, the boundary between the connecting portion 35d and the mounting portion 35b is reduced in mechanical strength to be easily deflectable as compared with a case where no notched holes 351d are provided.

According to this embodiment, the distance D3 between an end 353c, closer to the turntable 31, of the contact surface 351c of the leg portion 35c coming into contact with the base 34 and the mounting position of the mounting portion 35b is rendered larger than the distance D4 between the end 353c and the floating prevention portion 35a when the floating prevention member 35 is mounted on the corresponding projecting portion 34a of the base 34, as shown in FIG. 10.

The driving portion 40 is constituted of a transmission gear portion 41 for rotating the turntable 31 provided on the turning portion 30 left- and rightward (along arrows A and B in FIG. 1) in the horizontal plane and a stepping motor 42 serving as a driving source for the transmission gear portion 41, as shown in FIGS. 3 and 5. The transmission gear portion 41 is so formed that a gear 43 of resin, a torque limiter 60 and other gears 44 and 45 of resin are arranged in a gear box 46 of resin, as shown in FIG. 3.

Figure 11:
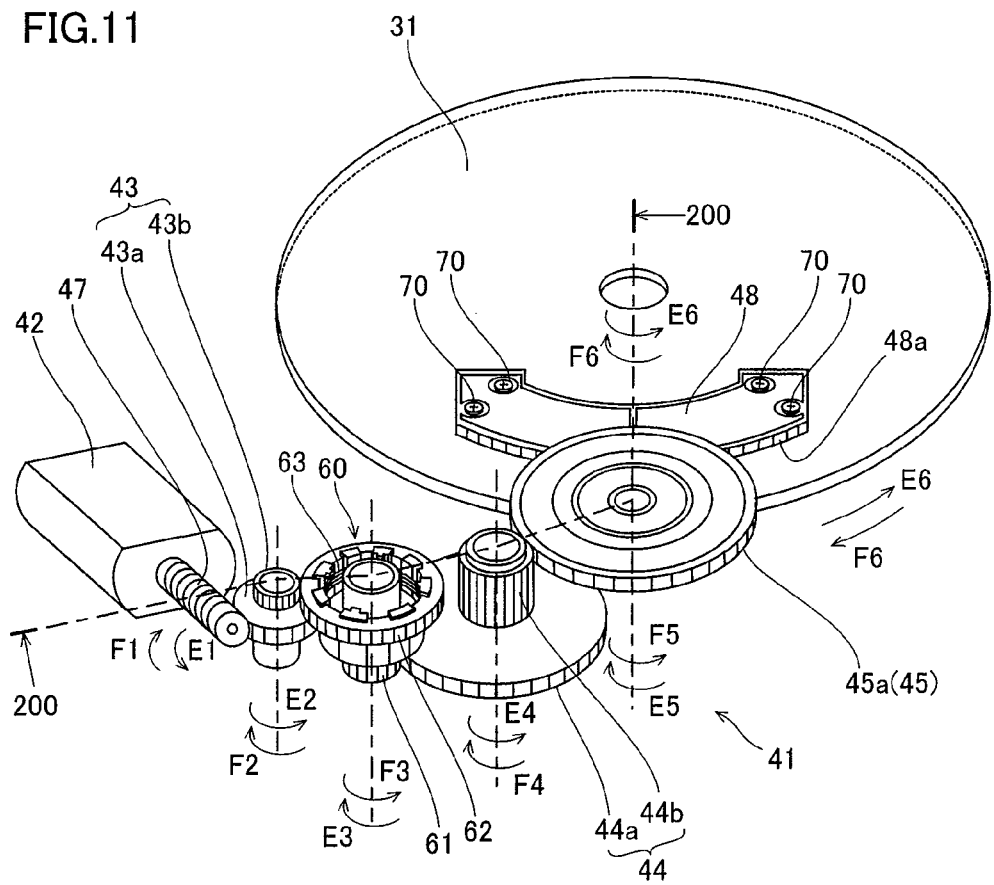
FIG. 11 is a perspective view for illustrating the structure of a transmission gear portion of the display screen turning apparatus according to the embodiment shown in FIG. 1.
Figure 12:
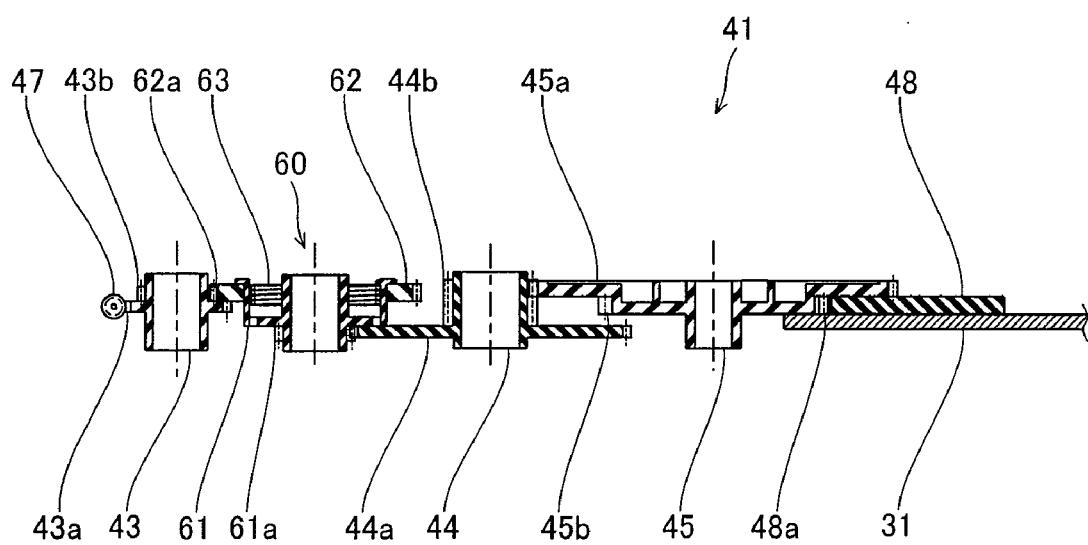
FIG. 12 is a sectional view taken along the line 200-200 in FIG. 11.

As shown in FIG. 11, a worm gear 47 of resin is press-fitted into the rotating shaft of the stepping motor 42. The gear 43 integrally includes a large-diametral gear portion 43a and a small-diametral gear portion 43b, as shown in FIGS. 11 and 12. Similarly, the gear 44 integrally includes a large-diametral gear portion 44a and a small-diametral gear portion 44b. The gear 45 also integrally includes a large-diametral gear portion 45a and a small-diametral gear portion 45b. The turning gear member 48 of resin is fixed to the upper surface of the turntable 31 of the turning portion 30 with four screws 70, as shown in FIGS. 3, 5 and 11. The gear box 46 (see FIG. 3) for storing the transmission gear portion 41 and the stepping motor 42 is omitted in FIG. 11, in order to illustrate the structure of the transmission gear portion 41.

As shown in FIGS. 11 and 12, the worm gear 47 meshes with the large-diametral gear portion 43a of the gear 43 so that the rotating shafts thereof are perpendicular to each other, while the small-diametral gear portion 34b of the gear 43 meshes with a gear portion 62a (see FIG. 12) of a driving gear 62 of the torque limiter 60 so that the rotating shafts thereof are parallel to each other. As shown in FIGS. 11 and 12, further, a gear portion 61a (see FIG. 12) of a driven gear 61 of the torque limiter 60 meshes with the large-diametral gear portion 45a of the gear 45 so that the rotating shafts thereof are parallel to each other, while the small-diametral gear portion 44b of the gear 44 meshes with the large-diametral gear portion 45a of the gear 45 so that the rotating shafts thereof are parallel to each other. In addition, the small-diametral gear portion 45b of the gear 45 meshes with a turning gear portion 48a of the turning gear member 48 so that the rotating shafts thereof are parallel to each other, as shown in FIGS. 11 and 12. Thus, the driving force of the stepping motor 42 is transmitted to the turntable 31 through the worm gear 47, the gear 43, the torque limiter 60, the gears 44, 45 and the turning gear member 48, due to the aforementioned arrangement of these gears shown in FIGS. 11 and 12.

The torque limiter 60 is constituted of the driving gear 61 of resin, the driven gear 62 of resin and a spring member (coil spring) 63 of metal, as shown in FIGS. 11 and 12. The torque limiter 60 is capable of turning the turntable 31 in the display screen turning apparatus 20 by transmitting the driving force of the stepping motor 42 to the turning portion 30 through the transmission gear portion 41 when the driving force of the stepping motor 42 is not more than prescribed driving torque, and is so formed as not to transmit the driving force of the stepping motor 42 to the turning portion 30 when the driving force of the stepping motor 42 exceeds the prescribed driving torque.

The display screen support mechanism 50 is provided on the upper surface of the turntable 31 of the display screen turning apparatus 20, as shown in FIG. 3. This display screen support mechanism 50 is constituted of a display screen support member 51 and a reinforcing member 52 for reinforcing the display screen support member 51. The display screen support member 51 and the reinforcing member 52 are fixed to the turntable 31 with two screws 70, to vertically extend with respect to the surface of the turntable 31. The display screen support member 51 is provided adjacent to the reinforcing member 52, and coupled to the reinforcing member 52 with three screws 70.

The display body 10 is constituted of a front cabinet 11 of resin and a rear cabinet 12 of resin, as shown in FIGS. 1 and 2. A liquid crystal module (not shown) mounted with a liquid crystal panel (not shown) is enclosed with the front cabinet 11 and the rear cabinet 12 in the display body 10. The display body 10 is mounted on the display screen support member 51 by fastening the screws 70 to screw mounting holes (not shown) through screw receiving holes 51a and 51b (see FIG. 2) of the display screen support member 51. The rear cabinet 12 is integrally provided with a hole 12a for arranging the display screen support member 51 in a concealed manner. A plurality of screw receiving holes 12b (seven in this embodiment) are provided on the outer periphery of the rear cabinet 12, so that the rear cabinet 12 is mounted on the front cabinet 11 with screws 80.

In the display screen turning apparatus 20, the cover member 21 of resin is mounted on the base 34 of the turning portion 30 with screws (not shown) from below the lower surface of the base 34, as shown in FIGS. 1 and 2. The cover member 22 of resin is so mounted as to cover the turning portion 30 from above and to be turnable in the horizontal direction (along arrows A and B in FIG. 1) along with the turntable 31 of the turning portion 31, as shown in FIGS. 1 and 2. The cover member 22 of resin is provided with a hole 22a for receiving the display screen support mechanism 50, as shown in FIGS. 1 and 2.

A left- and rightward turning operation of the display screen turning apparatus 20 according to this embodiment in the horizontal plane is now described with reference to FIGS. 1, 3, 4, 11, 12, 13 and 14.

In the state where the display screen support member 51 is perpendicular to the turntable 31 provided on the turning portion 30 and directed frontward (the center of the turning gear portion 48a of the turning gear member 48 meshes with the small-diametral gear portion 45b of the gear 45) as shown in FIG. 3, the user presses an automatic turning button (not shown) of an attached remote controller (not shown), so that a signal for turning the display body 10 (see FIG. 1) rightward (along arrow A in FIG. 1) is transmitted to a control circuit portion (not shown) of the display body 10. The stepping motor 42 of the display screen turning apparatus 20 is driven on the basis of this signal. More specifically, the stepping motor 42 is so driven that the worm gear 47 mounted thereon rotates along arrow E1 (see FIG. 11) and the gear 43 rotates along arrow E2 (see FIG. 11), as shown in FIG. 3. The driving gear 62 of the torque limiter 60 rotates along arrow E3 through the gear 43. The driven gear 61 of the torque limiter 60 also rotates along arrow E3, and the gear 44 rotates along arrow E4 (see FIG. 11). Further, the gear 45 rotates along arrow E5 (see FIG. 11), whereby the turning gear member 48 rotates along arrow E6. Thus, the turntable 31 provided on the turning portion 30 mounted with the display screen support member 51 starts turning along arrow G1 as shown in FIG. 13, whereby the display body 10 (see FIG. 1) starts turning-along arrows A (see FIG. 1).

Figure 13:
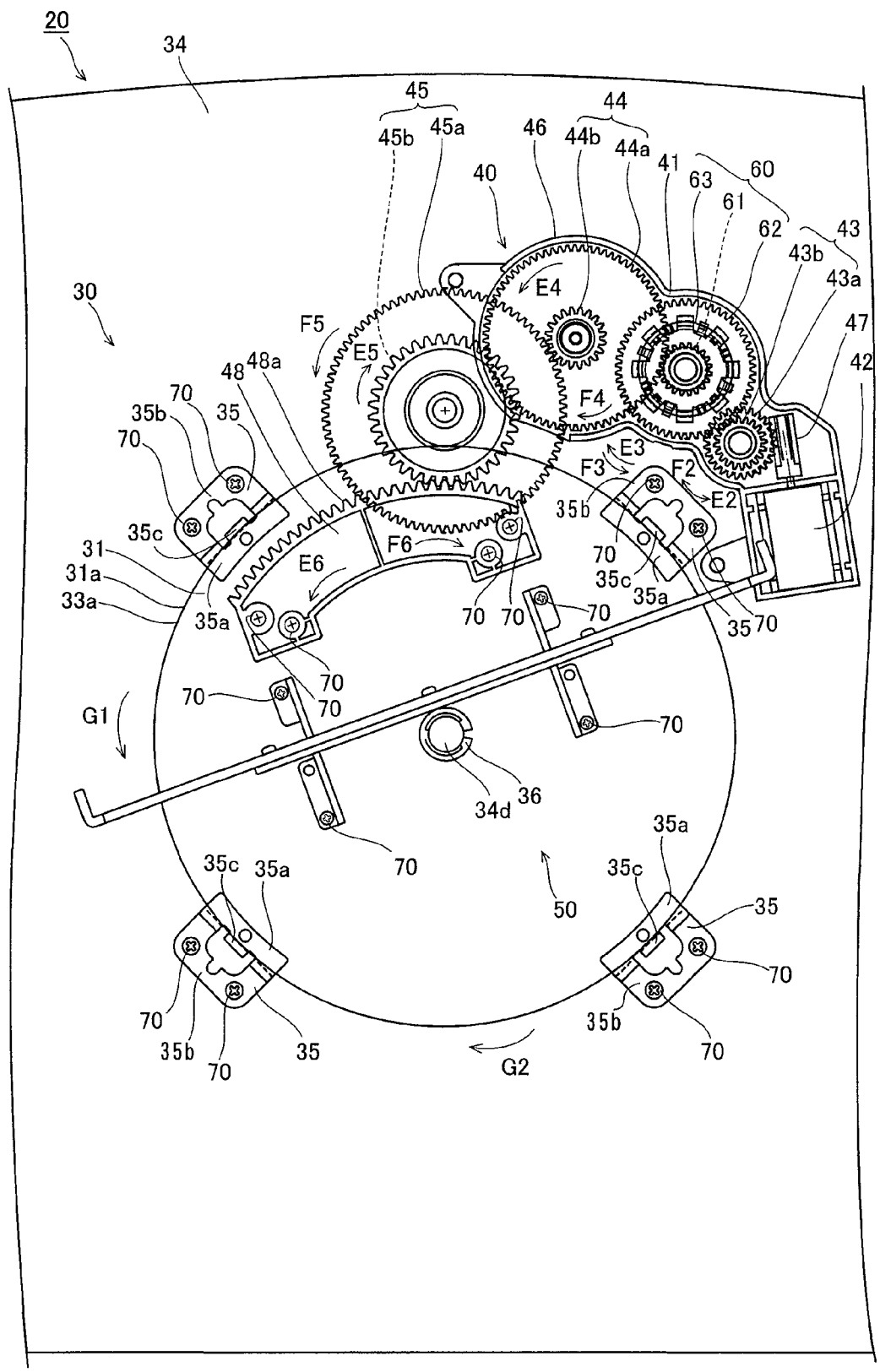
FIGS. 13 and 14 are diagrams for illustrating a turning operation of the display screen turning apparatus according to the embodiment shown in FIG. 1.
Figure 14:
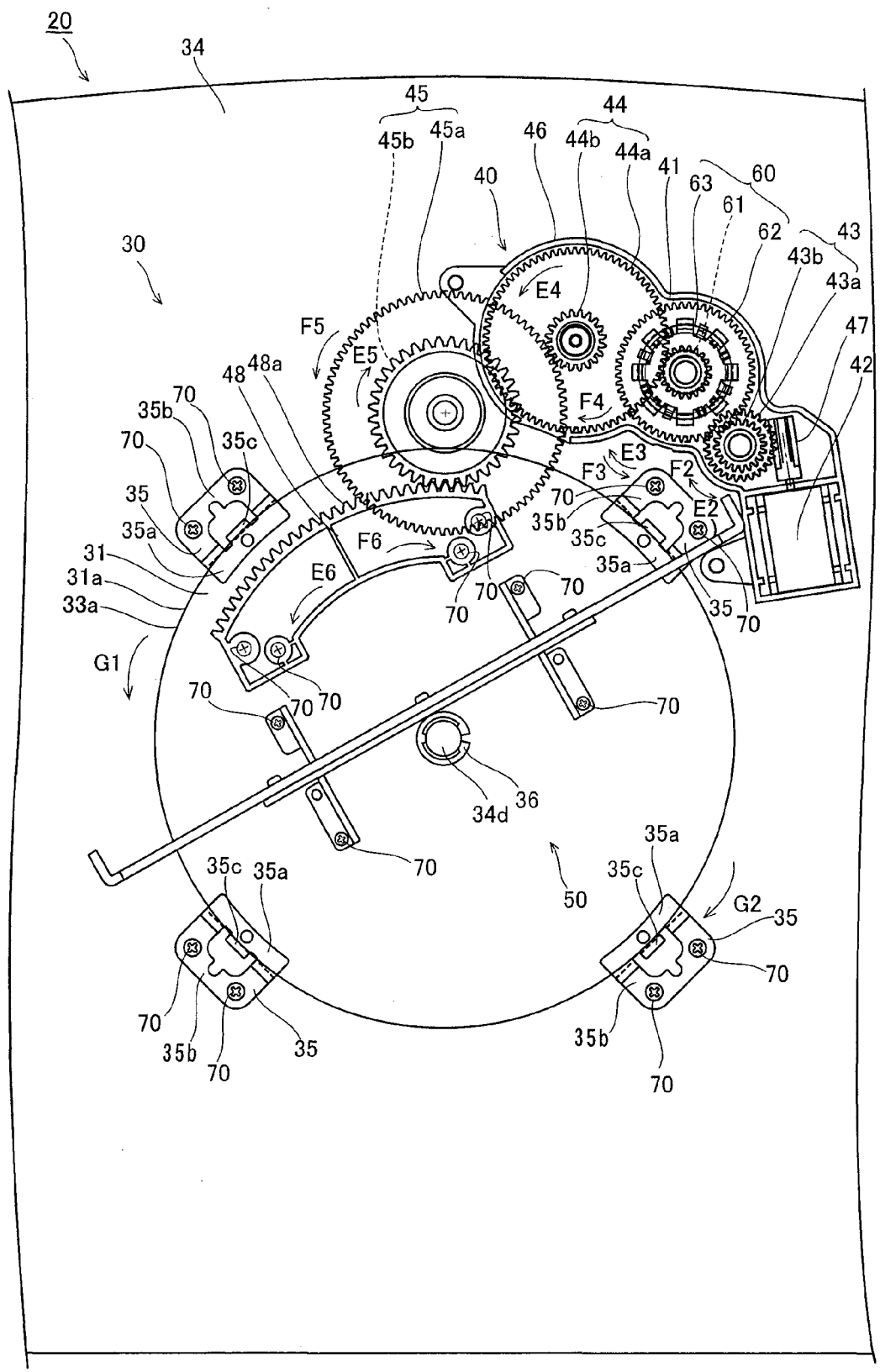

AS shown in FIG. 13, the turntable 31 provided on the turning portion 30 receiving the display body 10 (see FIG. 1) continuously turns along arrow A (see FIG. 1) at a prescribed rotational speed.

At this time, the turntable 31 turns while receiving the load of the display body 10 (see FIG. 1). The floating prevention portions 35a of the four floating prevention members 35 are arranged at the interval of about 0.2 mm with respect to the upper surface of the turntable 31 as shown in FIG. 4, whereby the turntable 31 turns while the outer peripheral surface 31a thereof is prevented from upward floating.

When the display body 10 turns up to an angle desirable for the user, the user releases the automatic turning button (not shown) of the attached remote controller (not shown), so that the signal for turning the display body 10 (see FIG. 1) rightward (along arrow A in FIG. 1) is not transmitted to the control circuit portion (not shown) of the display body 10. Therefore, the stepping motor 42 is stopped. Thus, the turntable 31 stops turning along arrow G1 on the position shown in FIG. 13, and comes to a standstill.

When the turning angle of the turntable 31 reaches the maximum (30° in this embodiment) while the user continuously turns the display body 10 (see FIG. 1) along arrow A (see FIG. 1), the turntable 31 comes into contact with a stopper member (not shown) provided in the turning portion 30, to be prevented from further turning along arrow A (see FIG. 1). Therefore, the turntable 31 stops turning along arrow G1 on the position shown in FIG. 14, and comes to a standstill. At this time, the stepping motor 42 is still continuously driven so that the driving torque is transmitted from the stepping motor 42 to the driving gear 62 of the torque limiter 60 through the worm gear 47 and the gear 43.

The driven gear 61 is pressed against the driving gear 62 by the spring member 63 with predetermined urging force, as shown in FIG. 12. If driving torque exceeding the frictional force between the outer peripheral surface of the driven gear 61 and the inner peripheral surface of the driving gear 62 is applied to the driving gear 62 due to the urging force of the spring member 63, therefore, the inner peripheral surface of the driving gear 62 and the outer peripheral surface of the driven gear 61 so slip as not to transmit the driving torque from the driving gear 62 to the driven gear 61. In other words, the driven gear 61, the gears 44 and 45 and the turning gear member 48 stop rotating when the turntable 31 comes into contact with the stopper member (not shown), regardless of the rotation of the driving gear 62.

While the turntable 31 rotates along arrow G1 shown in FIG. 13 in the above turning operation, the turntable 31 oppositely rotates along arrow G2 when turning the turntable 31 along arrow G2 through an operation similar to the above, so that the display body 10 (see FIG. 1) turns leftward (along arrow B in FIG. 1).

As hereinabove described, the display screen turning apparatus 20 according to this embodiment, comprising the floating prevention members 35 including the floating prevention portions 35a provided above the region where the upper surface of the turntable 31 close to the outer peripheral surface 31a is arranged as hereinabove described, can prevent the outer peripheral surface 31a of the turntable 31 from upward floating with the floating prevention portions 35a also when force upwardly moving the outer peripheral surface 31a of the turntable 31 acts on the turntable 31, thereby suppressing backlash (floating) on the outer peripheral surface 31a of the turntable 31. The floating prevention members 35 are so formed as to include the leg portions 35c provided between the floating prevention portions 35a and the mounting portions 35b for mounting the floating prevention members 35 on the projecting portions 34a of the base 34 for maintaining the upper surface of the base 34 and the floating prevention portions 35a of the floating prevention members 35 at the prescribed interval, whereby the leg portions 35c can inhibit the floating prevention portions 35a of the floating prevention members 35 from coming into contact with the turntable 31 also when the drawn projecting portions 34a of the base 34 are formed at a level lower than a prescribed height due to dispersion in dimensional accuracy.

According to this embodiment, as hereinabove described, the leg portions 35c provided on the floating prevention members 35 formed by the platelike members are so formed as to come into contact with the outer peripheral surface 31a of the turntable 31 on side end surfaces 352c in the thickness direction, whereby the turntable 31 can be horizontally positioned by the floating prevention members 35 so arranged that the leg portions 35c come into contact with four points of the outer peripheral surface 31a of the turntable 31 provided at the equiangular intervals of 90°.

Figure 15:
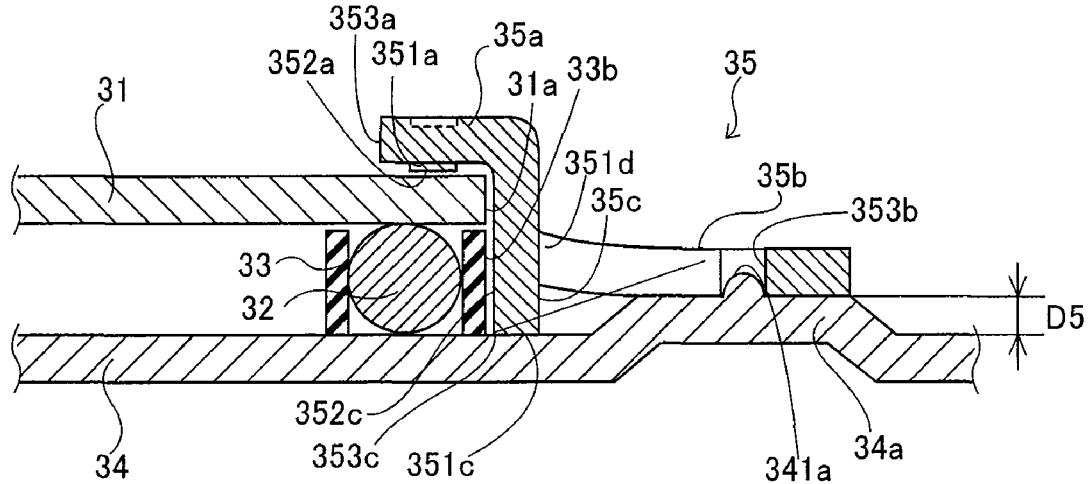
FIG. 15 is a sectional view taken along the line 100-100 in FIG. 3, showing a projecting portion of a base of the display screen turning apparatus according to the embodiment shown in FIG. 1 at a level lower than a prescribed height.

According to this embodiment, as hereinabove described, the floating prevention members 35 are so formed as to further include the vertically extending connecting portions 35d connecting the floating prevention portions 35a and the mounting portions 35b with each other, while the notched holes 351d are formed on the boundaries between the connecting portions 35d and the mounting portions 35b. Further, the notched holes 351d are connected with the engaging portions 353b provided on the mounting portions 35b, while reaching parts of the floating prevention portions 35a. Thus, the mechanical strength is reduced in the boundaries between the mounting portions 35b and the connecting portions 35b as compared with a case provided with no notched holes 351d, whereby the boundaries between the mounting portions 35b and the connecting portions 35d can be rendered easily deflectable. Also when the height D5 of each drawn projecting portion 34a of the base 34 is rendered smaller than the height D2 of about 2.95 mm shown in FIG. 10 due to dispersion in dimensional accuracy as shown in FIG. 15, therefore, the deviation in the height of the drawn projecting portion 34a of the base 34 from the designed value can be absorbed by deflecting the boundary between the corresponding connecting portion 35d and the corresponding mounting portion 35b, whereby the drawn projecting portion 34a of the base 34 and the corresponding floating prevention member 35 can be reliably fixed without adjusting the height of the leg portion 34c. Also when the height D5 of each drawn projecting portion 34a of the base 34 is rendered larger than the height D2 of about 2.95 mm shown in FIG. 10 due to dispersion in dimensional accuracy, further, the deviation in the height of the drawn projecting portion 34a of the base 34 from the designed value can be absorbed by deflecting the boundary between the corresponding connecting portion 35d and the corresponding mounting portion 35b, whereby the drawn projecting portion 34a of the base 34 and the corresponding floating prevention member 35 can be reliably fixed without adjusting the height of the leg portion 34c.

Figure 16:
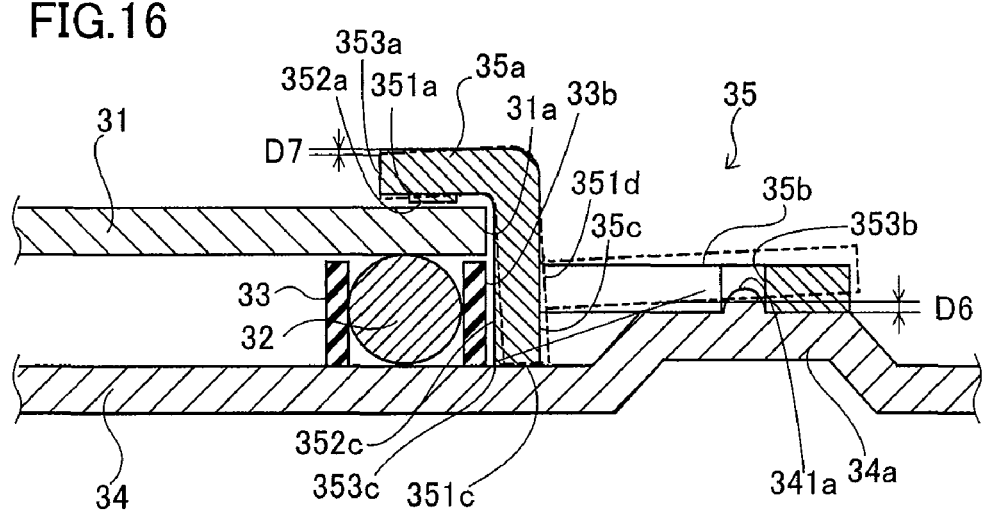
FIG. 16 is a sectional view taken along the line 100-100 in FIG. 3, showing the projecting portion of the base of the display screen turning apparatus according to the embodiment shown in FIG. 1 at a level higher than the prescribed height.

According to this embodiment, as hereinabove described, the distance D3 between the end 353c, closer to the turntable 31, of the contact surface 351c of each leg portion 35c coming into contact with the base 34 and the mounting position of each mounting portion 35b is rendered larger than the distance D4 between the end 353c and the floating prevention portion 35a, whereby the quantity of inclination (movement in the vertical direction) D7 of the floating prevention portion 35a is smaller than the deviation D6 in the height of the projecting portion 34a from the designed value even if the vertical size of the projecting portion 34a of the base 34 exceeds the height D2 of about 2.95 mm shown in FIG. 10 due to dispersion in dimensional accuracy and the floating member 35 is inclined toward the floating prevention portion 35a as shown by one-dot chain lines in FIG. 16. Even if the vertical size of the projecting portion 34a of the base 34 is rendered smaller than the height D2 of about 2.95 mm shown in FIG. 10 due to dispersion in dimensional accuracy and the floating member 35 is inclined toward the mounting portion 35b, further, the quantity of inclination (movement in the vertical direction) D7 of the floating prevention portion 35a is smaller than the deviation D6 in the height of the projecting portion 34a from the designed value. Thus, fluctuation in the interval between the floating prevention portion 35a and the turntable 31 can be reduced as compared with a case where the floating prevention member 35 is provided with no leg portion 35c, whereby the floating prevention portion 35a can be further inhibited from coming into contact with the turntable 31.

According to this embodiment, as hereinabove described, the protrusion 351a protruding toward the upper surface of the turntable 31 is formed on the portion of each floating prevention portion 35a opposed to the upper surface of the turntable 31 so that the interval between the floating prevention portion 35a and the turntable 31 can be adjusted by controlling the quantity of projection of the protrusion 351a of the floating prevention portion 35a protruding toward the upper surface of the turntable 31 also when the interval between the floating prevention portion 35a and the turntable 31 is dispersed due to dispersion in the height of the projecting portions 34a of the base 34 mounted with the mounting portion 35b, whereby precision in the interval between the floating prevention portion 35a and the turntable 31 can be increased.

According to this embodiment, as hereinabove described, the end surface 353a of the floating prevention portion 35a closer to the rotation center of the turntable 31 is so concavely bent that the turning gear member 48 provided on the turntable 31 can be prevented from coming into contact with the floating prevention member 35 upon rotation of the turntable 31. Thus, the turntable 31 can smoothly rotate.

According to this embodiment, as hereinabove described, each floating prevention member 35 includes the screw mounting hole 351b circular in plan view and the screw mounting hole 352b slitlike in plan view, whereby the circular screw mounting hole 351b of the floating prevention member 35 and the screw mounting hole 34b of the corresponding projecting portion 34a of the base 34 can be strongly fixed with the corresponding screw 70 on a prescribed position. Also when the screw mounting hole 34b provided on the projecting portion 34a of the base 34 deviates from the designed value, the corresponding screw 70 can be easily mounted through the slitlike screw mounting hole 352b of the floating prevention member 35.

According to this embodiment, as hereinabove described, the positioning protrusion 341a is provided on the upper surface of each drawn projecting portion 34a of the base 34, whereby the floating prevention member 35 can be positioned with the protrusion 341a, to be mounted on the upper surface of the drawn projecting portion 34a of the base 34 in the positioned state.

According to this embodiment, as hereinabove described, the mounting portion 35b of each floating prevention member 35 includes the concaved engaging portion 353b engaging with the protrusion 341a, whereby the floating prevention member 35 can be easily mounted in the positioned state by engaging the engaging portion 353b of the floating prevention member 35 with the positioning protrusion 341a of the base 34.

According to this embodiment, as hereinabove described, the notched holes 351d of each floating prevention member 35 are U-shaped in plan view, and so provided as to separate the leg portion 35c and the connecting portion 35d from each other so that the mechanical strength in the boundary between the connecting portion 35d and the mounting portion 35b is further reduced as compared with a case of not separating the leg portion 35c and the connecting portion 35d from each other, whereby the boundary between the connecting portion 35d and the mounting portion 35b can be rendered more easily deflectable. Also when the height of the drawn projecting portion 34a of the base 34 deviates from the designed value due to dispersion in dimensional accuracy, therefore, the deviation in the height of the drawn projecting portion 34a of the base 34 from the designed value can be absorbed by deflecting the boundary between the connecting portion 35d and the mounting portion 35b, whereby the projecting portion 34a of the base 34 and the floating prevention member 35 can be reliably fixed without adjusting the height of the leg portion 35c.

Although the present invention has been described and illustrated in detail, it is clearly understood that the same is by way of illustration and example only and is not to be taken by way of limitation, the spirit and scope of the present invention being limited only by the terms of the appended claims.

For example, while the display screen turning apparatus is provided on the liquid crystal television employed as an exemplary display in the aforementioned embodiment, the present invention is not restricted to this but the display screen turning apparatus may alternatively be provided on a display, such as an organic EL panel, having a display screen (display panel) other than the liquid crystal panel.

While the leg portion included in each floating prevention member is formed by vertically folding the floating prevention portion in the aforementioned embodiment, the present invention is not restricted to this but the leg portion may alternatively be separately formed, to be mounted on the floating prevention member.

While the holes formed in each floating prevention member are connected to the engaging portion provided on the mounting portion while reaching the part of the floating prevention portion in the aforementioned embodiment, the present invention is not restricted to this but the holes may alternatively be provided only in the vicinity of the connecting portion and the mounting portion, or may be replaced with notches.

While the surface of the protrusion, formed on each floating prevention member, opposed to the turntable is flat in the aforementioned embodiment, the present invention is not restricted to this but the portion of the protrusion opposed to the turntable may alternatively be spherically formed to come into point contact with the upper surface of the outer periphery of the turntable when the outer periphery of the turn table floats upward.

What is claimed is:

1. A display screen turning apparatus comprising:
   a rotating member mounted with a display screen and rotatable in a horizontal plane;
   a base, rotatably holding said rotating member, provided with a drawn projecting portion; and
   a floating prevention member so mounted on said projecting portion of said base as to prevent an outer periphery of said rotating member from upward floating, wherein
   said floating prevention member includes a floating prevention portion provided above a region of an upper surface of said rotating member close to the outer periphery and arranged not to come into contact with the upper surface of said rotating member, a mounting portion for mounting said floating prevention member on said projecting portion and a leg portion provided between said floating prevention portion and said mounting portion for maintaining an upper surface of said base and said floating prevention portion of said floating prevention member at a prescribed interval by coming into contact with the upper surface of said base,
   said floating prevention member further includes a vertically extending connecting portion connecting said floating prevention portion and said mounting portion with each other, and
   a gap is provided between said rotating member and said floating prevention portion.

2. The display screen turning apparatus according to claim 1, wherein
   said floating prevention member is formed by a plate member, and
   said leg portion provided on said floating prevention member formed by said plate member is so formed as to come into contact with an outer peripheral surface of said rotating member on a side end surface in the thickness direction.

3. The display screen turning apparatus according to claim 1, wherein
   a hole is formed at least on a boundary between said connecting portion and said mounting portion of said floating prevention member.

4. The display screen turning apparatus according to claim 3, wherein
   said hole is U-shaped in plan view, and so provided as to separate said leg portion and said connecting portion from each other.

5. The display screen turning apparatus according to claim 1, wherein the distance between an end, closer to said rotating member, of a contact surface of said leg portion coming into contact with said base and a mounting position of said mounting portion is larger than the distance between said end and said floating prevention portion.

6. The display screen turning apparatus according to claim 1, wherein
a protrusion protruding toward the upper surface of said rotating member is formed on a portion of said floating prevention portion opposed to the upper surface of said rotating member.

7. The display screen turning apparatus according to claim 1, wherein
a side end surface of said floating prevention portion closer to the rotation center of said rotating member is concavely bent.

8. The display screen turning apparatus according to claim 1, wherein
said floating prevention member includes a first screw mounting hole circular in plan view and a second elongated screw mounting hole in plan view.

9. The display screen turning apparatus according to claim 1, wherein a positioning protrusion is provided on the upper surface of said drawn projecting portion of said base.

10. The display screen turning apparatus according to claim 9, wherein
said mounting portion of said floating prevention member includes a concaved engaging portion engaging with said protrusion.

11. A display screen turning apparatus comprising:
a rotating member mounted with a display screen and rotatable in a horizontal plane;
a base, rotatably holding said rotating member, provided with a drawn projecting portion; and
a floating prevention member so mounted on said projecting portion of said base as to prevent an outer periphery of said rotating member from upward floating, wherein
said floating prevention member includes a floating prevention portion provided above a region of an upper surface of said rotating member close to the outer periphery and arranged not to come into contact with the upper surface of said rotating member, a mounting portion for mounting said floating prevention member on said projecting portion, a leg portion provided between said floating prevention portion and said mounting portion for maintaining an upper surface of said base and said floating prevention portion of said floating prevention member at a prescribed interval by coming into contact with the upper surface of said base and a vertically extending connecting portion connecting said floating prevention portion and said mounting portion with each other,
said floating prevention member is formed by a plate member,
said leg portion provided on said floating prevention member formed by said plate member is so formed as to come into contact with an outer peripheral surface of said rotating member on a side end surface in the thickness direction,
a hole is formed at least on a boundary between said connecting portion and said mounting portion of said floating prevention member,
the distance between an end, closer to said rotating member, of a contact surface of said leg portion coming into contact with said base and a mounting position of said mounting portion is larger than the distance between said end and said floating prevention portion, and
a protrusion protruding toward the upper surface of said rotating member is formed on a portion of said floating prevention portion opposed to the upper surface of said rotating member.

12. The display screen turning apparatus according to claim 11, wherein
a side end surface of said floating prevention portion closer to the rotation center of said rotating member is concavely bent.

13. The display screen turning apparatus according to claim 11, wherein
said floating prevention member includes a first screw mounting hole circular in plan view and a second elongated screw mounting hole in plan view.

14. The display screen turning apparatus according to claim 11, wherein
a positioning protrusion is provided on the upper surface of said drawn projecting portion of said base.

15. The display screen turning apparatus according to claim 14, wherein
said mounting portion of said floating prevention member includes a concaved engaging portion engaging with said protrusion.

16. The display screen turning apparatus according to claim 11, wherein
said hole is U-shaped in plan view, and so provided as to separate said leg portion and said connecting portion from each other.

* * * * *